United States Patent [19]
Raith

[11] Patent Number: 5,883,885
[45] Date of Patent: *Mar. 16, 1999

[54] BASE AND MOBILE STATIONS INCLUDING ENHANCED SLEEP MODE

[75] Inventor: Alex Krister Raith, Durham, N.C.

[73] Assignee: Telefonaktiebolaget LM Ericsson, Stockholm, Sweden

[ * ] Notice: The term of this patent shall not extend beyond the expiration date of Pat. No. 5,574,996.

[21] Appl. No.: 745,187

[22] Filed: Nov. 7, 1996

Related U.S. Application Data

[60] Continuation of Ser. No. 467,877, Jun. 6, 1995, Pat. No. 5,574,996, which is a division of Ser. No. 331,951, Oct. 31, 1994, Pat. No. 5,539,748, which is a continuation-in-part of Ser. No. 147,254, Nov. 1, 1993, Pat. No. 5,603,081.

[51] Int. Cl.[6] .................................................. G08C 17/00
[52] U.S. Cl. ........................................ 370/311; 455/161.1
[58] Field of Search ................................... 370/321, 310, 370/318, 311; 455/33.1, 34.1, 38.3, 54.1, 161.1, 161.2, 161.3, 434, 515, 161, 162, 574, 343, 383; 379/59, 60

[56] References Cited

U.S. PATENT DOCUMENTS

| | | | |
|---|---|---|---|
| 4,127,744 | 11/1978 | Yoshikawa et al. | 455/33.1 |
| 4,527,284 | 7/1985 | Röttger | 455/33.2 |
| 4,731,814 | 3/1988 | Becker et al. | 455/127 |
| 4,977,611 | 12/1990 | Maru | 455/161.3 |
| 5,065,423 | 11/1991 | Gaskill | 379/57 |
| 5,081,704 | 1/1992 | Umeda et al. | 455/33.1 |
| 5,119,502 | 6/1992 | Kallin et al. | 455/161.3 |
| 5,122,795 | 6/1992 | Cubley et al. | 340/825.44 |
| 5,128,938 | 7/1992 | Borras . | |
| 5,199,109 | 3/1993 | Baker | 455/161.3 |
| 5,266,945 | 11/1993 | Peek et al. | 340/825.44 |
| 5,301,225 | 4/1994 | Suzuki et al. | 379/59 |
| 5,325,088 | 6/1994 | Willard et al. | 340/825.2 |
| 5,353,332 | 10/1994 | Raith et al. | 379/59 |
| 5,375,254 | 12/1994 | Owen | 455/54.1 |
| 5,416,827 | 5/1995 | Gaskill | 379/57 |

FOREIGN PATENT DOCUMENTS

| | | |
|---|---|---|
| 335846 | 10/1989 | European Pat. Off. . |
| 445887 | 9/1991 | European Pat. Off. . |
| WO92/10042 | 6/1992 | WIPO . |

OTHER PUBLICATIONS

PCT International Search Report regarding PCT/US94/12619 Date of mailing: Mar. 13, 1995.

"A New Standard for North American Digital Cellular", Magnus Isaksson et al., *Ericsson Review*, No. 2, pp. 58–69 (1994).

"Use of Umbrella Cells in Idle Mode", Datacom. (DBP Telecom.) Tdoc SMG2, Turin, 05–08, May 7, 1992.

"The Evolution of Digital Cellular into Personal Communications", Uddenfeldt et al., presented at Telecom. 91, Geneva, Oct. 7–15, 1991.

"Idle Mode Cell Selection for Hierarchical Cell Structures", ETSI STC SMG2, Ad hoc meeting, Taastrup, Aug. 17, 1992.

"Idle Mode Cell Reselection for Microcells", ETSI GSM2, Ronneby, Sep. 17–20, 1991.

"Changes to idle Mode Cell Reselection for Microcells ", ETSI TC SMG Meeting No. 1, Lisbon, Jan. 31, 1992.

"Cellular System Dual–Mode Mobile Station—Base Station Compatibility Standard", EIA/TIA Interim Standard, IS–54–B, pp. 101–106; 109–116; 139–140; and 163–166 (Apr. 1992).

*Primary Examiner*—Ajit Patel
*Attorney, Agent, or Firm*—Burns, Doane, Swecker & Mathis, L.L.P.

[57] ABSTRACT

A method and system for providing an enhanced sleep mode for remote units in a radiocommunication system are described. Measurement periodicity for control channels of neighboring cells is optimized. Paging frame classes can also be temporarily modified to extend sleep periods.

2 Claims, 5 Drawing Sheets

| $HF_n$ | 0 | | 1 | | 2 | | 3 | | 4 | | 5 | | 6 | |
|---|---|---|---|---|---|---|---|---|---|---|---|---|---|---|
| $SF_n$ | 0 | 1 | 2 | 3 | 4 | 5 | 6 | 7 | 8 | 9 | 10 | 11 | 12 | 13 |
| $PF_1$ | p | s | p | s | p | s | p | s | p | s | p | s | p | s |
| $PF_2$ | p | s | - | - | p | s | - | - | p | s | - | - | p | s |
| $PF_3$ | p | s | - | - | - | - | p | s | - | - | - | - | p | s |
| $PF_4$ | p | s | - | - | - | - | - | - | p | s | - | - | - | - |

HF = HYPERFRAME
SF = SUPERFRAME
PF = PAGING FRAME
P = PRIMARY PCHs
S = SECONDARY PCHs

| BU = XXX | PCON = X | BCN = X | PFM = X | SMSN = X |
|---|---|---|---|---|
| 3 | 1 | 1 | 1 | 1 |

BASE AND MOBILE STATIONS INCLUDING ENHANCED SLEEP MODE

This application is a continuation, of application No. 08/467,877, filed Jun. 6, 1995, now U.S. Pat. No. 5,574,996, which is a divisional of application No. 08/331,951, filed Oct. 31, 1994, now U.S. Pat. No. 5,539,748, which is a continuation-in-part of application No. 08/147,254, filed Nov. 1, 1993, now U.S. Pat. No. 5,603,081.

BACKGROUND

Applicant's invention relates generally to radiocommunication systems and more particularly to radiocommunication systems in which evaluations of remote unit servers for potential control channel reselection are performed.

The growth of commercial radiocommunications and, in particular, the explosive growth of cellular radiotelephone systems have compelled system designers to search for ways to increase system capacity without reducing communication quality beyond consumer tolerance thresholds. One way to increase capacity is to use digital communication and multiple access techniques such as TDMA, in which several users are assigned respective time slots on a single radio carrier frequency.

In North America, these features are currently provided by a digital cellular radiotelephone system called the digital advanced mobile phone service (D-AMPS), some of the characteristics of which are specified in the interim standard IS-54B, "Dual-Mode Mobile Station-Base Station Compatibility Standard", published by the Electronic Industries Association and Telecommunications Industry Association (EIA/TIA). Because of a large existing consumer base of equipment operating only in the analog domain with frequency-division multiple access (FDMA), IS-54B is a dual-mode (analog and digital) standard, providing for analog compatibility in tandem with digital communication capability. For example, the IS-54B standard provides for both FDMA analog voice channels (AVC) and TDMA digital traffic channels (DTC), and the system operator can dynamically replace one type with the other to accommodate fluctuating traffic patterns among analog and digital users. The AVCs and DTCs are implemented by frequency modulating radio carrier signals, which have frequencies near 800 megahertz (MHz) such that each radio channel has a spectral width of 30 kilohertz (KHz).

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user.

The successive time slots assigned to the same user, which are usually not consecutive time slots on the radio carrier, constitute the user's digital traffic channel, which may be considered a logical channel assigned to the user. As described in more detail below, digital control channels (DCCs) can also be provided for communicating control signals, and such a DCC is a logical channel formed by a succession of usually non-consecutive time slots on the radio carrier.

According to IS-54B, each TDMA frame consists of six consecutive time slots and has a duration of 40 milliseconds (msec). Thus, each radio channel can carry from three to six DTCs (e.g., three to six telephone conversations), depending on the source rates of the speech coder/decoders (codecs) used to digitally encode the conversations. Such speech codecs can operate at either full-rate or half-rate, with full-rate codecs being expected to be used until half-rate codecs that produce acceptable speech quality are developed. A full-rate DTC requires twice as many time slots in a given time period as a half-rate DTC, and in IS-54B, each radio channel can carry up to three full-rate DTCs or up to six half-rate DTCs. Each full-rate DTC uses two slots of each TDMA frame, i.e., the first and fourth, second and fifth, or third and sixth of a TDMA frame's six slots. Each half-rate DTC uses one time slot of each TDMA frame. During each DTC time slot, 324 bits are transmitted, of which the major portion, 260 bits, is due to the speech output of the codec, including bits due to error correction coding of the speech output, and the remaining bits are used for guard times and overhead signalling for purposes such as synchronization.

It can be seen that the TDMA cellular system operates in a buffer-and-burst, or discontinuous-transmission, mode: each mobile station transmits (and receives) only during its assigned time slots. At full rate, for example, a mobile station might transmit during slot 1, receive during slot 2, idle during slot 3, transmit during slot 4, receive during slot 5, and idle during slot 6, and then repeat the cycle during succeeding TDMA frames. Therefore, the mobile station, which may be battery-powered, can be switched off, or sleep, to save power during the time slots when it is neither transmitting nor receiving. In the IS-54B system in which the mobile does not transmit and receive simultaneously, a mobile can sleep for periods of at most about 27 msec (four slots) for a half-rate DTC and about 7 msec (one slot) for a full-rate DTC.

In addition to voice or traffic channels, cellular radiocommunication systems also provide paging|access, or control, channels for carrying call-setup messages between base stations and mobile stations. According to IS-54B, for example, there are twenty-one dedicated analog control channels (ACCs), which have predetermined fixed frequencies located near 800 MHz. Two frequency bands, each about 25-MHz wide (the A- and B-bands), are provided for transmission and reception. The AVCs and DTCs are also located within the A- and B-bands. Since these ACCs are always found at the same frequencies, they can be readily located and monitored by the mobile stations.

It will be understood that a communication system that uses ACCs has a number of deficiencies. For example, the format of the forward analog control channel specified in IS-54B is largely inflexible and not conducive to the objectives of modern cellular telephony, including the extension of mobile station battery life. In particular, the time interval between transmission of certain broadcast messages is fixed and the order in which messages are handled is also rigid. Also, mobile stations are required to re-read messages that may not have changed, wasting battery power. These deficiencies can be remedied by providing a DCC, one example of which is described in U.S. patent application No. 07/956, 640 entitled "Digital Control Channel", which was filed on Oct. 5, 1992, and which is incorporated in this application by reference. Using such DCCs, each IS-54B radio channel can carry DTCs only, DCCs only, or a mixture of both DTCs and DCCs. Within the IS-54B framework, each radio carrier frequency can have up to three full-rate DTCs/DCCs, or six half-rate DTCs/DCCs, or any combination in-between, for example, one full-rate and four half-rate DTCs/DCCs. As described in this application, a DCC in accordance with Applicant's invention provides a further increase in functionality.

In general, however, the transmission rate of the DCC need not coincide with the half-rate and full-rate specified in IS-54B, and the length of the DCC slots may not be uniform and may not coincide with the length of the DTC slots. The DCC may be defined on an IS-54B radio channel and may consist, for example, of every n-th slot in the stream of consecutive TDMA slots. In this case, the length of each DCC slot may or may not be equal to 6.67 msec, which is the length of a DTC slot according to IS-54B. Alternatively (and without limitation on other possible alternatives), these DCC slots may be defined in other ways known to one skilled in the art.

Also, U.S. patent application Ser. No. 07/956,640 also shows how a DCC may be defined alongside the DTCs specified in IS-54B. For example, a half-rate DCC could occupy one slot and a full-rate DCC could occupy two slots out of the six slots in each TDMA frame. For additional DCC capacity, additional half-rate or full-rate DCCs could replace DTCs. In general, the transmission rate of a DCC need not coincide with the half-rate and full-rate specified in IS-54B, and the length of the DCC time slots need not be uniform and need not coincide with the length of the DTC time slots.

FIG. 1 shows a general example of a forward DCC configured as a succession of time slots 1, 2, . . . , N, . . . belonging to a particular DCC. These DCC slots may be defined on a radio channel such as that specified by IS-54B, and may consist, for example, of every n-th slot in a series of N consecutive slots. Each DCC slot has a duration that may or may not be 6.67 msec, which is the length of a DTC slot according to the IS-54B standard. The DCC slots shown in FIG. 1 are organized into superframes (SF)', and each superframe includes a number of logical channels that carry different kinds of information. One or more DCC slots may be allocated to each logical channel in the superframe.

FIG. 1 also shows an exemplary downlink superframe, which includes at least three logical channels: a broadcast control channel (BCCH) including six successive slots for overhead messages; a paging channel (PCH) including one slot for paging messages; and an access response channel (ARCH) including one slot for channel assignment and other messages. The remaining time slots in the exemplary superframe of FIG. 1 may be dedicated to other logical channels, such as additional paging channels PCH or other channels. Since the number of mobile stations is usually much greater than the number of slots in the superframe, each paging slot is used for paging several mobile stations that share some unique characteristic, e.g., the last digit of the MIN.

For purposes of efficient sleep mode operation and fast cell selection, the BCCH may be divided into a number of sub-channels. U.S. patent application No. 07/956,640 discloses a BCCH structure that allows the mobile station to read a minimum amount of information when it is switched on (when it locks onto a DCC) before being able to access the system (place or receive a call). After being switched on, an idle mobile station needs to regularly monitor only its assigned PCH slots (usually one in each superframe); the mobile can sleep during other slots. The ratio of the mobile's time spent reading paging messages and its time spent asleep is controllable and represents a tradeoff between call-set-up delay and power consumption.

As such hybrid analog/digital systems mature, the number of analog users should diminish and the number of digital users should increase until all of the analog voice and control channels are replaced by digital traffic and control channels. When that occurs, the current dual-mode mobile terminals can be replaced by less expensive digital-only mobile units, which would be unable to scan the ACCs currently provided in the IS-54B system. One conventional radiocommunication system used in Europe, known as GSM, is already an all-digital system, in which 200-KHz-wide radio channels are located near 900 MHz. Each GSM radio channel has a gross data rate of 270 kilobits per second and is divided into eight full-rate traffic channels (each traffic time slot carrying 116 encrypted bits).

Digital control and traffic channels are also desirable for other reasons described in U.S. patent application No. 08/147,254, entitled "A Method for Communicating in a Wireless Communication System", which was filed on Nov. 1, 1993, and which is incorporated in this application by reference. For example, they support longer sleep periods for the mobile units, which results in longer battery life. Although IS-54B provides for digital traffic channels, more flexibility is desirable in using digital control channels having expanded functionality to optimize system capacity and to support hierarchical cell structures, i.e., structures of macrocells, microcells, picocells, etc. The term "macrocell" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, e.g., a convention center or a busy street, and a picocell might cover an office corridor or a floor of a high-rise building. From a radio coverage perspective, macrocells, microcells, and picocells may be distinct from one another or may overlap one another to handle different traffic patterns or radio environments. Each of these types of cells has a base station which transmits at least one control channel. Thus, a number of neighboring control channels are present for a mobile or remote unit to evaluate as a possible replacement for the current serving control channel to which it is locked.

Accordingly, both ACCs and DCCs will be periodically evaluated by the mobile station for possible control channel reselection. Conventionally, for example, when in an idle state (i.e., switched on but not making or receiving a call), a mobile station in an IS-54B system tunes to and then regularly monitors the strongest control channel (generally, the control channel of the cell in which the mobile station is located at that moment) and may receive or initiate a call through the corresponding base station. When moving between cells while in the idle state, the mobile station will eventually "lose" radio connection on the control channel of the "old" cell and tune to the control channel of the "new" cell. The initial tuning and subsequent re-tuning to control channels are both accomplished automatically by scanning all the available control channels at their known frequencies to find the "best" control channel. The terms "scan" or "scanning" as used in this document, can refer to, for example, signal strength measurement, actual signal decoding, or any other method of evaluating a signal.

When a control channel with good reception quality is found, the mobile station remains tuned to this channel until the quality deteriorates again. In this way, mobile stations stay "in touch" with the system. The analog (non-slotted) control channels specified in IS-54B require the mobile stations to remain continuously (or at least 50% of the time) "awake" in the idle state, at least to the extent that they must keep their receivers switched on. Thus, these conventional systems typically evaluate candidate control channels for reselection purposes at some predetermined, fixed intervals.

According to a more recent innovation in cell reselection disclosed in U.S. Pat. No. 5,353,332 to Raith and Muller, each control channel in each cell is configured to broadcast information about the presence, if any, of other cells and the characteristics of those cells including minimum quality criteria, power requirements, etc. Typically, information about the presence of other cells is broadcast about neighboring cells. For instance, a neighboring cell may be adjacent to, overlapping, or non-contiguous from the broadcasting cell. A mobile periodically scans during idle mode the neighboring control channels in the coverage area that the mobile is located in to determine which cell it should be locked to. Each control channel includes a neighbor list. The neighbor list identifies other control channels which mobiles locked to that control channel should periodically evaluate. Thus, a mobile may continuously select cells to be locked to based on the existing location of the mobile and quality criteria (e.g., received signal strength) associated with the cells. The cell to which the mobile may be locked is the cell in which the mobile satisfies the quality criteria associated with the cell.

While in the idle state, and in addition to evaluating control channels as potential reselection candidates, a mobile station must monitor the control channel for paging messages addressed to it. For example, when an ordinary telephone (land-line) subscriber calls a mobile subscriber, the call is directed from the public switched telephone network (PSTN) to a mobile switching center (MSC) that analyzes the dialed number. If the dialed number is validated, the MSC requests some or all of a number of radio base stations to page the called mobile station by transmitting over their respective control channels paging messages that contain the mobile identification number (MIN) of the called mobile station. Each idle mobile station receiving a paging message compares the received MIN with its own stored MIN. The mobile station with the matching stored MIN transmits a page response over the particular control channel to the base station, which forwards the page response to the MSC.

Upon receiving the page response, the MSC selects an AVC or a DTC available to the base station that received the page response, switches on a corresponding radio transceiver in that base station, and causes that base station to send a message via the control channel to the called mobile station that instructs the called mobile station to tune to the selected voice or traffic channel. A through-connection for the call is established once the mobile station has tuned to the selected AVC or DTC.

As noted above, one of the goals of a digital cellular system is to increase the user's "talk time", i.e., the battery life of the mobile station. To this end, U.S. patent application No. 07/956,640 discloses a digital forward control channel (base station to mobile station) that can carry the types of messages specified for current analog forward control channels (FOCCs), but in a format which allows an idle mobile station to read overhead messages when locking onto the FOCC and thereafter only when the information has changed; the mobile sleeps at all other times. In such a system, some types of messages are broadcast by the base stations more frequently than other types, and mobile stations need not read every message broadcast.

While the innovative system described in the aforementioned patent application provides many benefits in terms of efficient sleep mode operation with respect to paging, additional features may be advantageous. For example, it would be advantageous to provide the capability to temporarily reassign a mobile or remote station to a different paging class to provide the flexibility necessary for changing system conditions in a cell specific manner.

SUMMARY

Accordingly to exemplary embodiments of the present invention, mobile or other remote units are able to sleep for longer periods of time, and battery life is extended, by optimizing the periodicity at which the remote unit measures control channels on a neighboring list to determine if a new control channel should replace the serving control channel. According to other exemplary embodiments of the present invention, a paging frame class which has been assigned to the remote unit can be modified so that the remote unit monitors the paging channel at intervals which are more battery conservative based on current communication conditions.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

According to exemplary embodiments of the present invention, the measurement periodicity for evaluating control channels for potential reselection of the serving control channel can be optimized to increase "sleep time" of the remote unit and extend battery life. Briefly, control channels are used for setting up calls, informing the base stations about locations and parameters associated with mobile stations, and informing the mobile stations about locations and parameters associated with the base stations. The base stations listen for call access requests by mobile stations and the mobile stations in turn listen for paging messages.

Future systems will employ additional cells. For example, new systems may include any combination of macrocells, indoor microcells, outdoor microcells, public microcells and restricted or private microcells. New systems therefore will likely be designated to incorporate an increasing number of control channels. Currently, there are approximately twenty-one analog control channels available for a cluster in a typical system employed in the United States.

Figure 1:
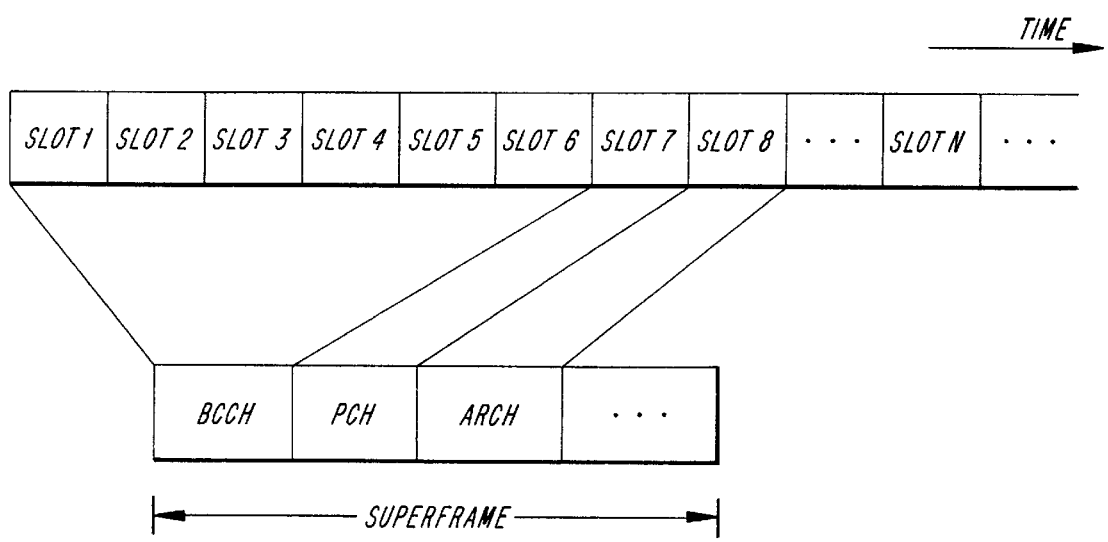
FIG. 1 depicts an exemplary forward digital control channel.
Figure 2:
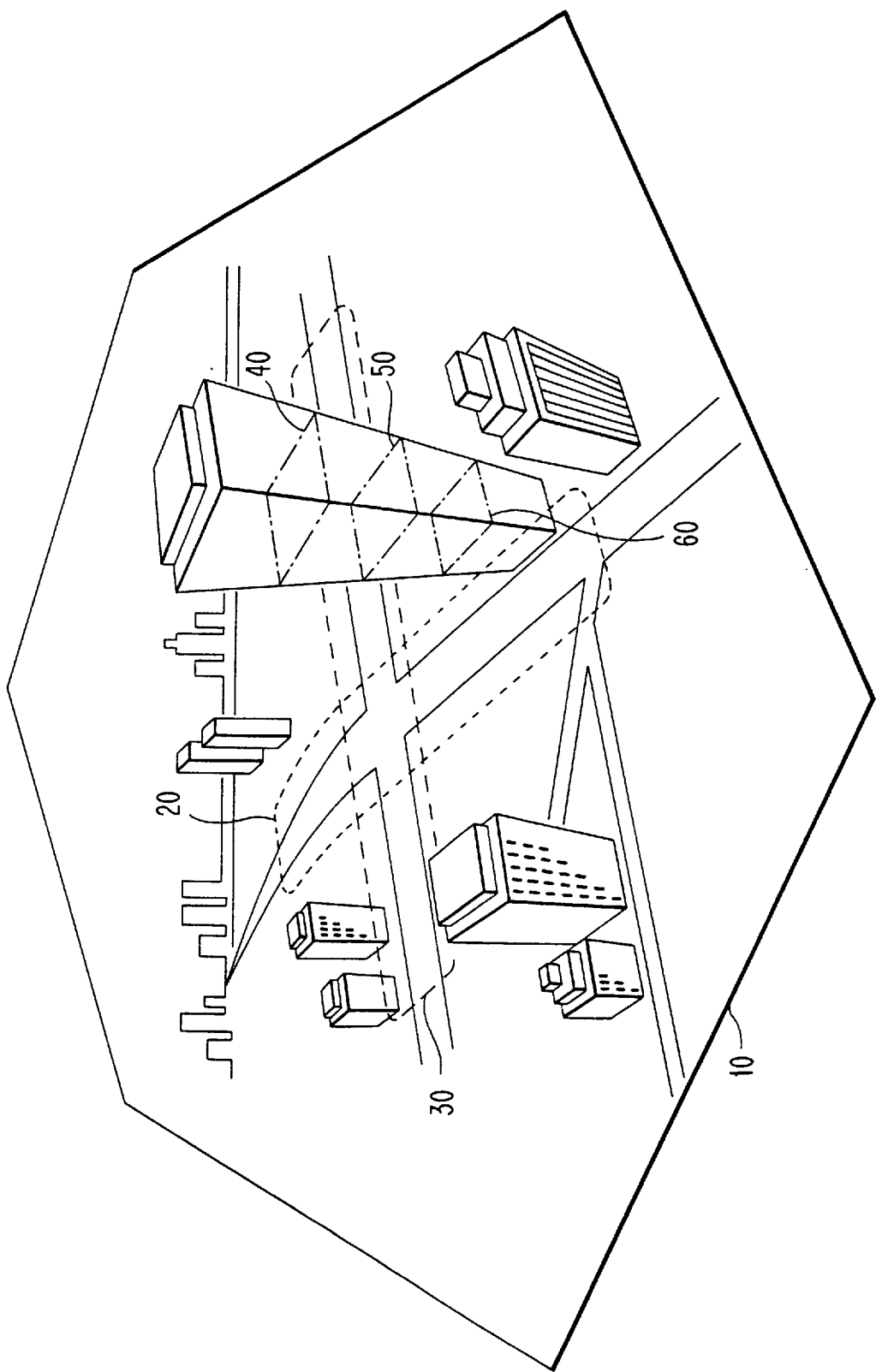
FIG. 2 shows an example of a hierarchical cell structure.

FIG. 2 is an exemplary hierarchical, or multi-layered, cellular system. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas along city streets, and picocells 40, 50, and 60, which cover individual floors of a building. The intersection of the two city streets covered by the microcells 20 and 30 may be an area of dense traffic concentration, and thus might represent a hot spot.

Each of the cells illustrated in FIG. 2 will include a base station transmitting on at least one control channel. Consider the remote station, e.g., a portable unit, which is travelling down the city streets and up into the building including picocells 40, 50, and 60. During various portions of this transit, potentially all of the control channels associated with the umbrella cell 10, the microcells 20 and 30 and the picocells 40, 50, and 60 may be transmitted on the neighbor list of control channel candidates for reselection. Evaluating those control channels to determine if reselection is desirable is performed by having the remote station scan those channels (e.g., measure the received signal strength (RSS) or decode portions of the signal).

The periodicity with which a mobile or remote station scans the control channels in the neighbor list during the idle mode can be controlled according to exemplary embodiments of the present invention as follows. Two information elements can be transmitted on the broadcast control channel (BCCH) for the mobile or remote unit to receive that are related to this scanning process. A SCANFREQ information element can be sent in the control channel selection message on the BCCH to inform the mobile or remote station about a default minimum number of signal strength measurements to be made per time period, for example, per superframe. Alternatively, some default value could be provided without transmitting this information element. For a complete discussion of superframes and hyperframes, the interested reader is referred to U.S. patent application Ser. No. 08/147, 254 incorporated above. Briefly, each superframe includes a complete set of F-BCCH information (i.e., a set of Layer 3 messages), using as many slots as are necessary, and that each superframe begins with a F-BCCH slot. After the F-BCCH slot(s), the remaining slots in each superframe include one or more (or no) slots E-BCCH, S-BCCH and SPACH logical channels. A hyperframe consists of two superframes. Thus, the mobile station will perform a total of SCANFREQ signal strength measurements per superframe regardless of the size of the neighbor list. Alternatively, SCANFREQ can indicate measurements per time interval, e.g., superframe, for each entry in the neighbor list.

The number of measurements made by the mobile station on each control channel in the neighbor list per time interval raises an interesting tradeoff. On the one hand, the more measurements which are made, the more accurate the measurement information will be. On the other hand, the greater the number of measurements, the greater the drain on the mobile or remote unit's battery. Since it may be desirable to allow the mobile to take a greater or lesser number of measurements on particular control channels in the neighbor list to finely balance these competing factors, the default SCANFREQ frequency or rate can be modified by a second parameter, denoted HL_FREQ, as described below.

The HL_FREQ information element is transmitted in the neighbor list. For each entry in the neighboring list there is an associated HL_FREQ information element. If the HL_FREQ is set to HIGH, this particular control channel is to be measured using the default frequency or rate defined by the SCANFREQ parameter. If, on the other hand, the HL_FREQ information element is set to LOW, this particular control channel can be measured, for example, at half the frequency or rate required by the default SCANFREQ parameter. Of course those skilled in the art will recognize that the particular assignment of HIGH and LOW values of HL_FREQ to the attributes described above is arbitrary and could be reversed.

For example, consider that the neighbor list contains 16 entries, eight of which have HL_FREQ set to HIGH and eight of which have HL_FREQ set to LOW. If the SCANFREQ parameter is set to be 12 measurements per superframe, then the number of measurements for entries marked as HIGH can be measured at a minimum rate of $^{12}/_{16}$ per superframe. For entries marked as LOW, the mobile or remote shall measure these control channels at a minimum rate of $(^{12}/_{16})/2$ per superframe. Thus, the total number of measurements in this example per superframe would then be:

$$(^{12}/_{16})*8+((^{12}/_{16})/2)*8=9$$

To facilitate sleep mode efficiency for the mobile or remote stations, the basic procedure outlined above can be adjusted by the mobile or remote station to reduce the frequency or rate of measurements required. The following discussion describes three exemplary techniques which may be used by the mobile or remote station to reduce the measurement frequency and thereby minimize battery drain.

Figure 3:
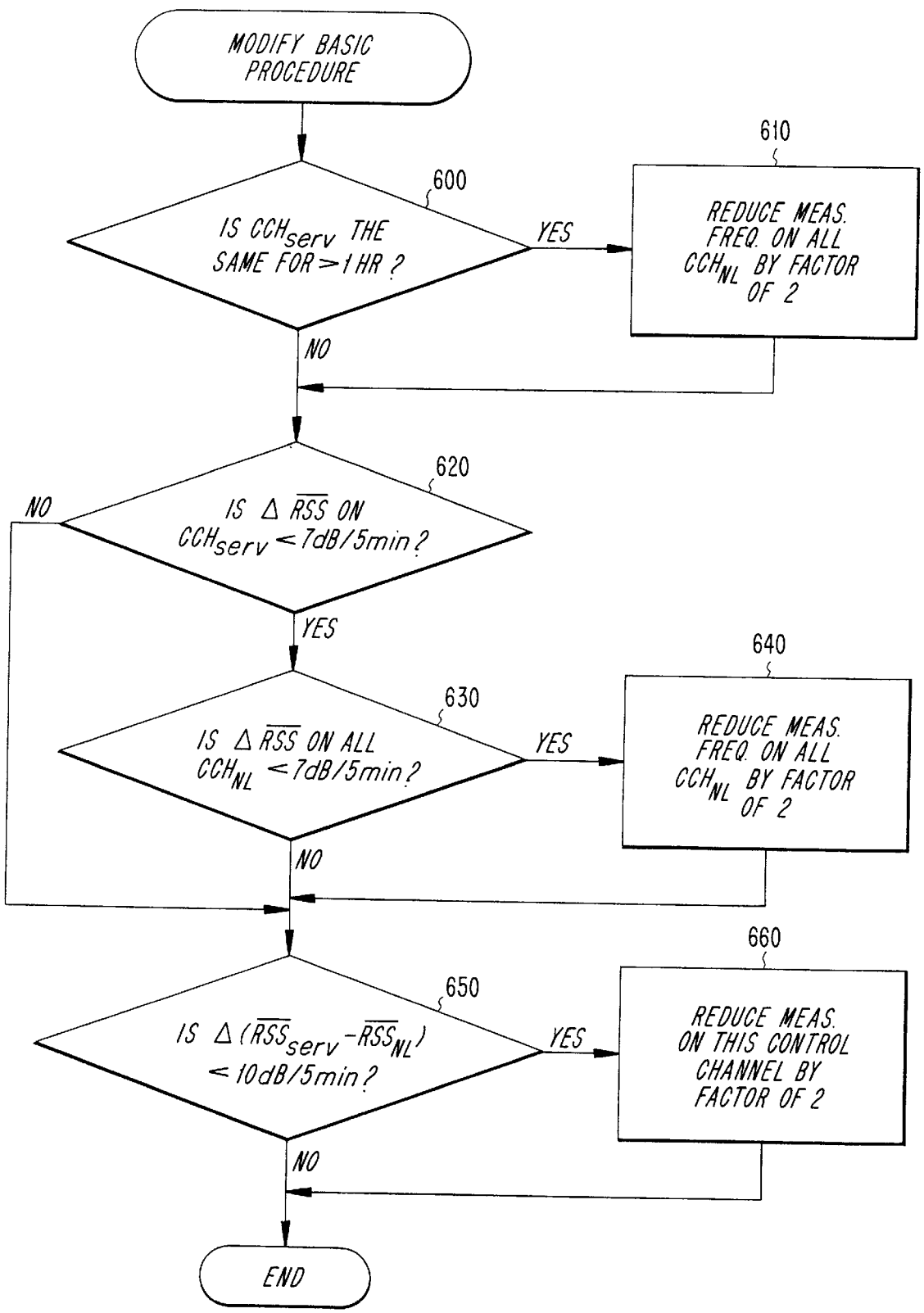
FIG. 3 is a flowchart illustrating control channel measurement according to an exemplary embodiment of the present invention.

The flowchart in FIG. 3 illustrates three exemplary tests for reducing the measurement frequency of control channels in the neighboring list as a cumulative procedure such that the measurement frequency can be cumulatively reduced by some factor for each test that is validated. However, those skilled in the art will readily appreciate that these three tests could be used on their own or in various combinations rather than being cumulative as set forth in this exemplary embodiment.

At decision block 600, the first test is implemented by determining if the current control channel has been serving the mobile or remote station for more than a predetermined period of time, for example, one hour. This test can be used, for example, to reduce measurements when the remote station is not moving. If so, then the flow moves to block 610 where the measurement frequency on control channels identified by the neighbor list can be reduced by some predetermined factor, for example, a factor of two. If not, then no reduction in the frequency measurement is indicated by this test and the flow moves to 620.

The second exemplary test is based on an average received signal strength (RSS) for the serving control channel and the control channels in the neighbor list. An average received signal strength can be used to provide a statistically accurate representation, as opposed to any one instantaneous measurement which could be skewed due to, for example, Rayleigh fading. For the purposes of this example, assume that the mobile or remote station keeps a running average of the last five signal strength measurements for each measured frequency. Then, the compound test expressed by decision block 620 and 630 is as follows. If the rate of change of the average received signal strength on the serving channel is not less than some predetermined threshold rate, for example, 7 dB over a previous five minutes, then no reduction in the measurement frequency is warranted and the flow moves down to block 650. Otherwise, the flow moves to decision block 630 and it is determined whether the change in the average received signal strength on all of the control channels in the neighbor list is less than some predetermined threshold rate, for example, 7 dB over a previous five minutes. If so, then the measurement frequency or rate of the control channels in the neighbor list can be reduced by some predetermined factor, e.g., two. Otherwise, no reduction in the rate of frequency is warranted. In either case, the flow moves on to the third test at block 650.

Therein, it is determined whether or not the rate of change of a difference between the average received signal strength of the serving control channel and of some specific entry in the neighbor list is less than some predetermined threshold rate, e.g., 10 dB over the last five minutes. If so, then the measurement frequency or rate of the control channels in the neighbor list can then be reduced by a factor, for example, two at block 660. Otherwise, no reduction is warranted and in any event the procedure is then completed.

The aforedescribed process illustrates exemplary ways in which the number of measurements taken by the mobile or remote station on channels in the neighboring list may be reduced to conserve battery power. As the conditions which triggered the reduction in measurement frequency change so that those conditions no longer hold, then the corresponding reduction in measurement frequency can be revoked. For example, the process illustrated in FIG. 3 can be performed periodically, e.g., every minute. Thus, if a mobile had previously reduced its measurement frequency of the control channels on the neighbor list based on satisfaction of the criteria in block 600 and, in a subsequent iteration the mobile had changed its serving control channel, the reduction of block 610 would be revoked.

In addition to being "awake" to measure control channels, a mobile or remote station is also awake periodically so that it can receive a page. Specifically, the mobile may be paged at any time, therefore the mobile must be locked to a particular cell in a location area so that the mobile may receive the page. For example, if the mobile has moved out of the location area of a first cell to which the mobile was locked to a second cell in a different location area, a paging request for the mobile will not be heard or received because the mobile switching center, or MSC, will page the mobile over a paging channel available to the location area in which the mobile is registered. Thus, a paging request would not be received by the mobile in the distant location area if it is not registered in that location area. Therefore, the mobile should register with a new base station when entering a new location area.

Figures 4, 5:
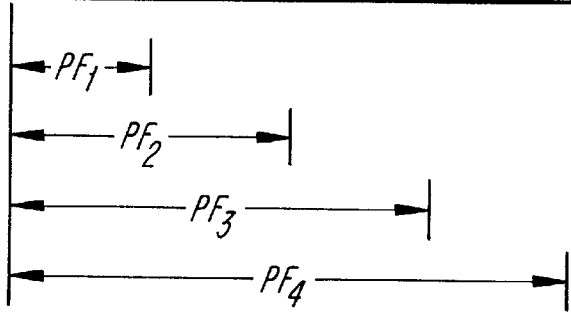
FIG. 4 is an illustration of different paging frame classes.
FIG. 5 depicts an exemplary SPACH header.

According to exemplary embodiments of the present invention, pages are repeated periodically and the mobile station can be assigned to a paging frame class at registration to take advantage of knowledge of this periodicity to remain asleep longer. Exemplary paging frame classes are illustrated in FIG. 4. Therein note that a first paging frame class is defined as being every hyperframe, a second paging frame class spans two hyperframes, a third paging frame class spans three hyperframes, and a fourth paging frame class spans four hyperframes. When the mobile station registers, it can temporarily change its paging frame class to $PF_1$ until it receives a registration response. If the registration response contains a new paging frame class assignment, then that shall be the assigned paging frame class for the mobile. Otherwise, the mobile can retain the default paging frame class of $PF_1$.

Having been assigned a paging frame class, either by default or through the registration response, the mobile station shall then awaken to determine if it is being paged more or less frequently based upon its paging frame class. According to exemplary embodiments of the present invention, the system can adjust the frequency with which the mobile station awakens to monitor the paging channel without actually changing the mobile station's assigned paging frame class. This provides a solution to another dilemma facing system designers, i.e., the tension between paging frequency and call-setup delay. Consider that the more frequently a mobile or remote unit is paged, the less call-setup delay there will be. However, the more frequently a mobile can be paged, the more often a mobile must "awaken" to potentially receive a page, resulting in greater battery drain. Thus, during periods such as nighttime hours or other times when communication with the mobile or remote station is expected to be less frequent, exemplary embodiments of the present invention provide a mechanism for allowing the mobile or remote station to sleep longer and take advantage of greater tolerance for call-setup delay.

This is accomplished, for example, by transmitting a paging frame modifier (PFM) from the system to the mobile station in a routinely transmitted overhead message via the digital control channel. One exemplary mechanism for transmitting the PFM is in a header of the SPACH channel, e.g., in every PCH subchannel. The SPACH channel, as described in more detail in the above-incorporated U.S. patent application Ser. No. 08/147,254, carries layer 2 messages which are used to carry point-to-point SMS, paging or ARCH information. An exemplary SPACH Header including the PFM bit is illustrated as FIG. 5. By adjusting the paging frame class of a mobile or remote unit in this way, a cell specific adjustment can be made (rather than changing paging classes upon registration which requires an entire registration area, i.e., potentially many cells, change) and synchronization can be maintained. Thus, the PFM field is unaddressed in the sense that it is transmitted to every mobile or remote in a cell as opposed to a page which is directed to a particular remote or mobile station.

According to exemplary embodiments of the present invention, the paging frame modifier can comprise a single bit which, if set to binary "0", indicates that the mobile unit should continue to use its assigned paging frame class. If, however, the PFM bit is set to binary "1" then the mobile station will adjust its paging frame class, for example, to the next higher paging frame class. As an example, assume that a mobile station has been assigned to paging frame class 2 ($PF_2$) such that it monitors its paging channel for a page every other hyperframe. Then, assume that the paging frame modifier bit transmitted on the SPACH channel is subsequently set to binary "1". At this point, the mobile will act as if its assigned paging frame class is $PF_3$ and will sleep longer until the PFM reverts to "0". Mobiles or remote stations which are asleep when the PFM is changes will nonetheless become quickly aware in their change of paging frame class since, according to this example, the PFM is transmitted as a bit on the SPACH header.

Figure 6:
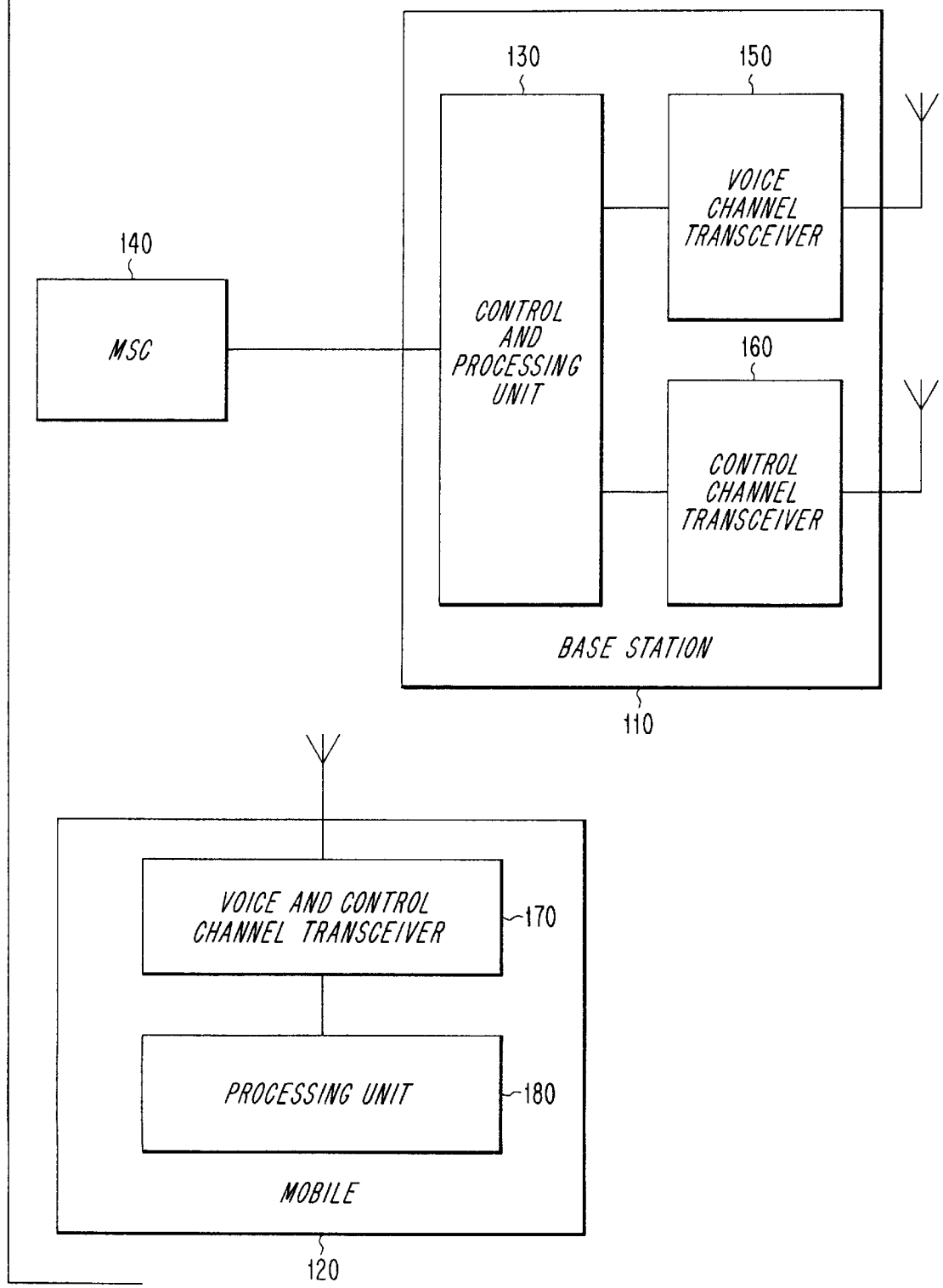
FIG. 6 represents a block diagram of an exemplary cellular mobile radiotelephone system.

The foregoing has described mobile and base station operation in terms of functional qualities. While specific hardware implementations of such stations per se are known to those skilled in the art, a brief example will now be described. FIG. 6 represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by the above-cited U.S. patent applications and by allowed U.S. patent application No. 07/670,237 entitled "Neighbor-Assisted Handoff in a Cellular Communication System" by Wejke et al., and U.S. patent application No. 07/967,027 entitled "Multi-Mode Signal Processing", both of which are incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with DCCs and DTCs that share the same radio carrier frequency.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332, which is incorporated in this application by reference.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A base station comprising:

a transmitter for transmitting supervisory data messages on a control channel and for providing neighboring lists of control channels to remote units;

said supervisory data messages including an instruction for remote units to modify a default frequency rate at which at least one control channel identified in said neighboring lists is to be scanned.

2. A method for controlling scanning of a plurality of control channels by a remote station comprising the steps of:

providing a default scanning frequency for said control channels;

transmitting a supervisory data message which includes an instruction that indicates whether said default scanning frequency is to be modified; and modifying the default scanning frequency of said plurality of control channels based on said supervisory data message.

* * * * *